US010928333B2

United States Patent
Guillot et al.

(10) Patent No.: US 10,928,333 B2
(45) Date of Patent: Feb. 23, 2021

(54) SYSTEM AND METHOD FOR THE POSITIONING AND OPTICAL INSPECTION OF AN OBJECT

(71) Applicant: VIT, Saint-Egreve (FR)

(72) Inventors: Nicolas Guillot, Saint-Egreve (FR); Mathieu Perriollat, Saint-Egreve (FR); Camille Thenaisy, Saint-Egreve (FR)

(73) Assignee: VIT, Saint-Egreve (FR)

( * ) Notice: Subject to any disclaimer, the term of this patent is extended or adjusted under 35 U.S.C. 154(b) by 10 days.

(21) Appl. No.: 16/343,764

(22) PCT Filed: Nov. 20, 2017

(86) PCT No.: PCT/FR2017/053184
§ 371 (c)(1),
(2) Date: Apr. 21, 2019

(87) PCT Pub. No.: WO2018/100267
PCT Pub. Date: Jun. 7, 2018

(65) Prior Publication Data
US 2020/0057004 A1    Feb. 20, 2020

(30) Foreign Application Priority Data

Nov. 29, 2016 (FR) ...................................... 1661652

(51) Int. Cl.
*G01N 21/956* (2006.01)
(52) U.S. Cl.
CPC . *G01N 21/95607* (2013.01); *G01N 21/95684* (2013.01); *G01N 2021/95615* (2013.01); *G01N 2021/95638* (2013.01)

(58) Field of Classification Search
CPC combination set(s) only.
See application file for complete search history.

(56) References Cited

U.S. PATENT DOCUMENTS 4,680,627 A * 7/1987 Sase ................. G01N 21/95607
348/129
4,783,826 A * 11/1988 Koso ................ G01N 21/95607
348/130

(Continued)

FOREIGN PATENT DOCUMENTS

EP    0206712 A2    12/1986
EP    3032306 A1    6/2016

(Continued)

OTHER PUBLICATIONS

Written Opinion of the International Searching Authority for International Application No. PCT/FR2017/053184, dated Feb. 13, 2018, 7 pages.

(Continued)

*Primary Examiner* — Tsung Yin Tsai
(74) *Attorney, Agent, or Firm* — Moreno IP Law LLC

(57) ABSTRACT

The invention concerns a method of optical, inspection of an electronic circuit (Card) including the acquisition of images of the electronic circuit by image sensors (C), the use of the images to determine the offset between the position of the electronic circuit (Card) and an inspection position, and the use of said images in at least another step of the method.

28 Claims, 3 Drawing Sheets

(56) References Cited

U.S. PATENT DOCUMENTS

| | | | | |
|---|---|---|---|---|
| 5,495,535 A * | 2/1996 | Smilansky | ....... | G01N 21/95607 348/E7.085 |
| 6,298,149 B1 * | 10/2001 | Nichani | ........... | G01N 21/95607 382/149 |
| 6,362,877 B1 * | 3/2002 | Kobayashi | ........... | G01R 31/281 356/237.5 |
| 7,058,221 B1 * | 6/2006 | Shikata | ................ | G06K 9/6203 382/169 |
| 7,071,468 B2 * | 7/2006 | Miyai | ................. | G01N 23/2251 250/306 |
| 7,639,860 B2 * | 12/2009 | Sasai | ................ | G01N 21/95607 382/141 |
| 8,233,698 B2 * | 7/2012 | Yamashita | ............... | G06K 9/32 382/149 |
| 2001/0053245 A1 * | 12/2001 | Sakai | ....... | G06T 7/001 382/151 |
| 2005/0161426 A1 | 7/2005 | Ozaki et al. | | |
| 2008/0317330 A1 * | 12/2008 | Takeda | ............. | G01N 21/95607 382/149 |
| 2010/0309308 A1 * | 12/2010 | Saphier | .................... | G06T 7/33 348/92 |
| 2012/0019650 A1 * | 1/2012 | Perriollat | ........... | G01B 11/2545 348/87 |
| 2013/0020392 A1 * | 1/2013 | Olmstead | .............. | G07G 1/0063 235/440 |

FOREIGN PATENT DOCUMENTS

| | | |
|---|---|---|
| JP | 2014228412 A | 12/2014 |
| WO | 2014167248 A1 | 10/2014 |

OTHER PUBLICATIONS

Preliminary Search Report for International Application No. PCT/FR2017/053184, dated Feb. 13, 2018, 3 pages.

* cited by examiner

SYSTEM AND METHOD FOR THE POSITIONING AND OPTICAL INSPECTION OF AN OBJECT

FIELD

The present disclosure generally relates to optical inspection systems and, more specifically, to three-dimensional image determination systems intended for the on-line analysis of objects, particularly of electronic circuits.

BACKGROUND

Optical inspection systems are generally used to check the sound condition of an object before it is released to the market. They particularly enable to determine a three-dimensional image of the object, which can be analyzed to search for possible defects. In the case of an electronic circuit comprising, for example, a printed circuit fitted with electronic components, the three-dimensional image of the electronic circuit may be used, in particular, to inspect the sound condition of the weldings of the electronic components on the printed circuit.

For certain optical inspection systems, the object to be inspected is displaced to an inspection position via a conveyor. At least one position sensor is used to detect that the object is located in the inspection position, in order to control the stopping of the conveyor. The position sensor may be of mechanical, magnetic, or light beam projection type. As an example, the sensor may comprise a cell emitting a light beam which is interrupted or reflected by object to be inspected when the latter reaches the inspection position.

A disadvantage is that the position detected by the position sensor may be incorrect. Indeed, the materials forming the object to be inspected may disturb the operation of the position sensor. This may in particular be the case when the object to be inspected is an electronic circuit, in particular a printed circuit, which may have reflective metallic materials, opaque materials, or partially transparent materials at its surface. Further, the object to be inspected may have an irregular shape in the region which is detected by the position sensor. This may particularly occur when the object to be inspected is an electronic circuit, in particular a printed circuit, for which the circuit edge may locally exhibit a significant change of shape, for example, a cutting, at the level of the area which is detected by the position sensor. Thereby, with the variations of electronic circuit manufacturing methods, the position of the edge detected by the position sensor may vary from one electronic circuit to the other.

A possibility is, taking into account the object to be inspected, to displace the position sensor to a location where more reliable position measurements can be performed. However, the displacement of the position sensor increases the installation time of the optical inspection method. This is not desirable, in particular when the optical inspection method is implemented for small series. Further, the access to the position sensor may be difficult.

SUMMARY

An object of an embodiment is to overcome all or part of the disadvantages of the previously-described optical inspection systems comprising a device of detection of the position of an object to be inspected.

Another object of an embodiment is for the operation of the device of detection of the position of an object to be inspected not to be disturbed by the nature of the materials at the surface of the object.

Another object of an embodiment is for the operation of the device of detection of the position of an object to be inspected not to be disturbed by the shape of the object.

Another object of an embodiment is for the optical inspection system to be adapted to correct the position detected by a mechanical, magnetic, or light beam projection position sensor.

Another object of an embodiment is for the optical inspection system to comprise no mechanical, magnetic, or light beam projection position sensor.

Thus, an embodiment provides a method of optical inspection of an electronic circuit comprising the acquisition of images of the electronic circuit by image sensors, the use of the images to determine the offset between the position of the electronic circuit and an inspection position, and the use of said images in at least another, step of the method.

According to an embodiment, the method comprises modifying the position of the electronic circuit when said offset is greater than a threshold.

According to an embodiment, the method comprises com-paring, for each image sensor among some of the image sensors, the image acquired by image sensor with at least one reference image.

According to an embodiment, the method comprises com-paring, for each image sensor among some of the image sensors, the acquired image with at least one additional reference image obtained from the reference image.

According to an embodiment, the method comprises com-paring, for each image sensor among some of the image sensors, the image acquired by the image sensor with a first reference image and with a second reference image obtained by blurring of the first reference image.

According to an embodiment, the method comprises com-paring, for each image sensor among some of the image sensors, the image acquired by the image sensor with a third reference image obtained by extraction of contours of the first reference image.

According to an embodiment, the method comprises com-paring, for each image sensor among some of the image sensors, the image acquired by the image sensor with a fourth reference image obtained by blurring of the third reference image.

According to an embodiment, the image sensors are displaced along a first direction with respect to the electronic circuit at least from a first location along the first direction to acquire images of a first portion of the electronic circuit to a second location along the first direction to acquire images of a second portion of the electronic circuit, the electronic circuit being displaced to a first position when the image sensors are at the first location and to a second position, different from the first position, when the image sensors are at the second location, or the image sensors being displaced along a second direction, which is not parallel to the first direction, to a third position along the second direction when the image sensors are at the first location along the first direction and to a fourth position along the second direction, different from the third position, when the image sensors are at the second location along the first direction.

According to an embodiment, the first portion of the electronic circuit is in the sharpness zone of the image sensors when the electronic circuit is in the first position or when the image sensors are in the third position, and the second portion of the electronic circuit is in the sharpness zone of the image sensors when the electronic circuit is in the second position or when the image sensors are in the fourth position.

According to an embodiment, at least two portions of the electronic circuit rest on two supports and the other step comprises modifying the position of each support, independently from each other.

According to an embodiment, the electronic circuit comprises a printed circuit, each support supporting a lateral edge of the printed circuit.

According to an embodiment, a conveyor transports the electronic circuit along a conveying direction of the electronic circuit, the supports extending parallel to the conveying direction of the electronic circuit.

According to an embodiment, a displacement device transports the image sensors along a displacement direction of the image sensors, which it not parallel, to the conveying direction of the electronic circuit, especially perpendicular to the conveying direction of the electronic circuit.

According to an embodiment, each support is displaced, independently from each other, along a support displacement direction, which is not parallel to the conveying direction of the electronic circuit and to the displacement direction of the image sensor, particularly perpendicular to the conveying direction electronic circuit and to the displacement direction of the image sensor.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
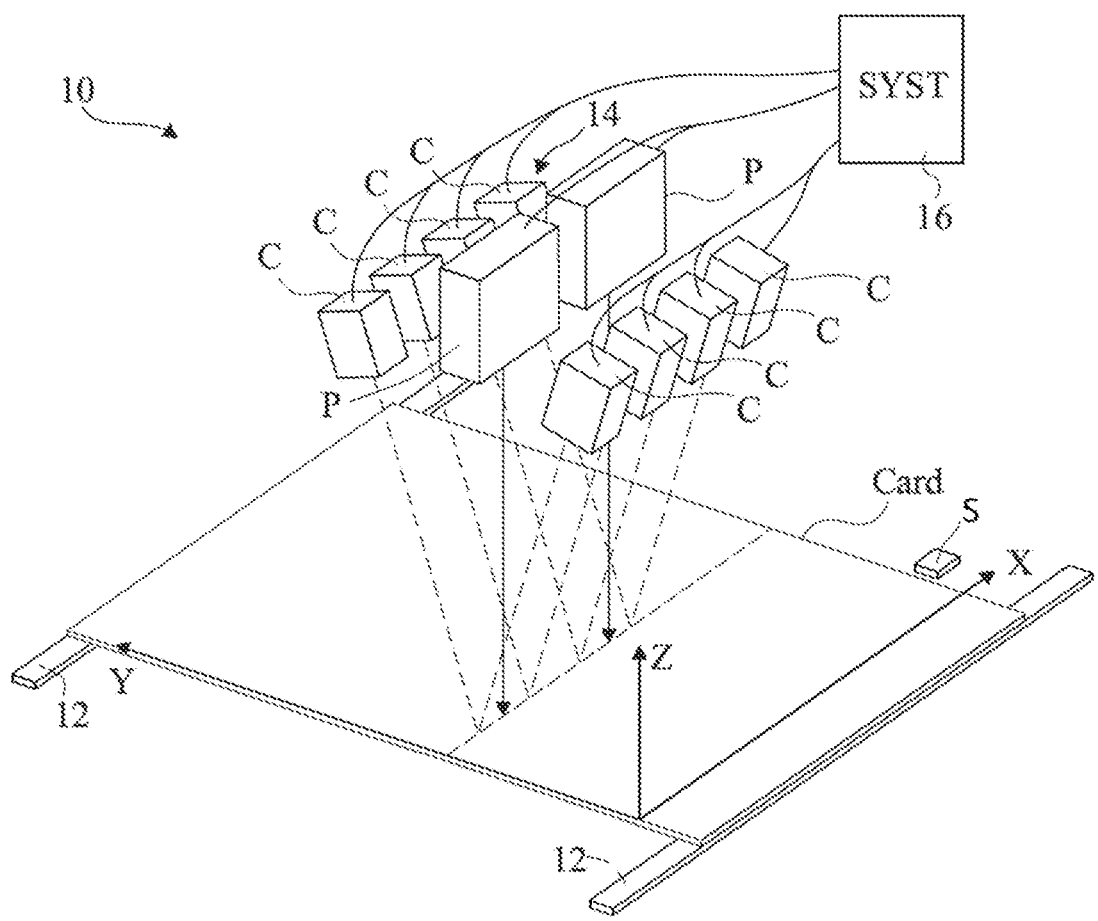
FIGS. 1, 2 and 3 respectively are a perspective view, a top view, and a side view, partial and simplified, of an embodiment of an optical inspection system.
Figure 2:
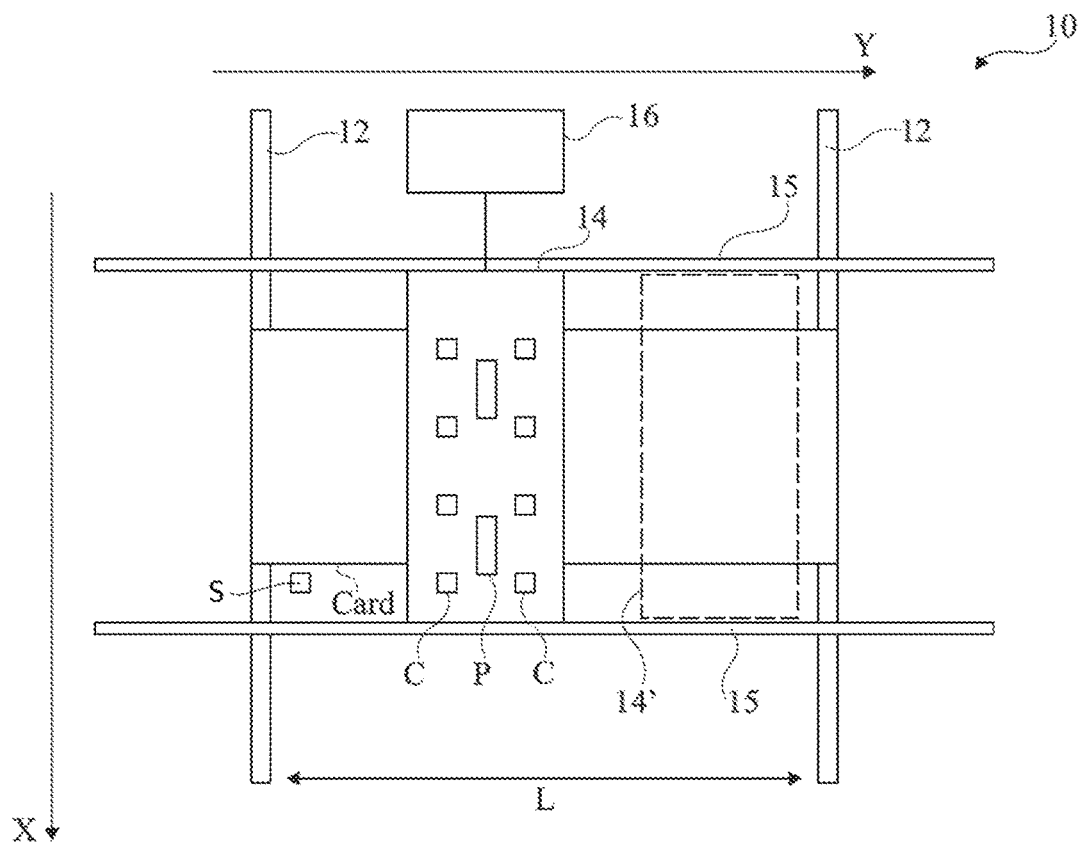
Figure 3:
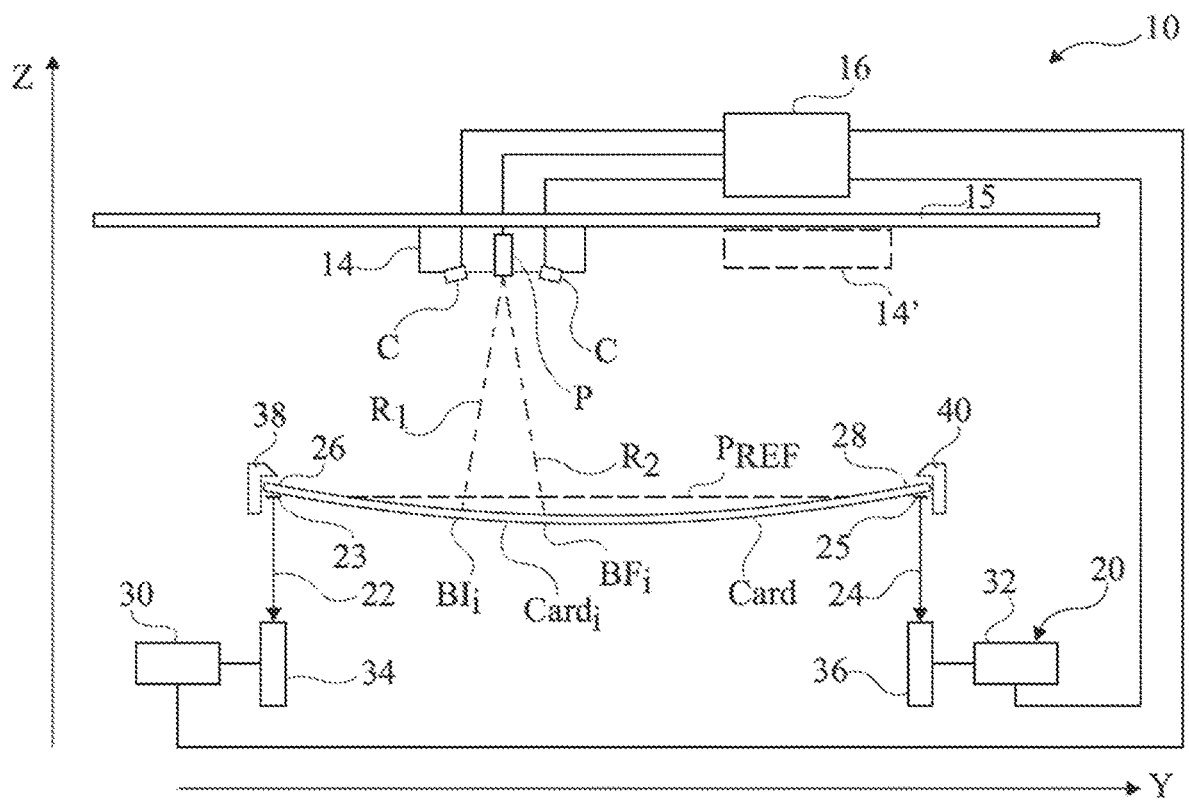
Figure 4:
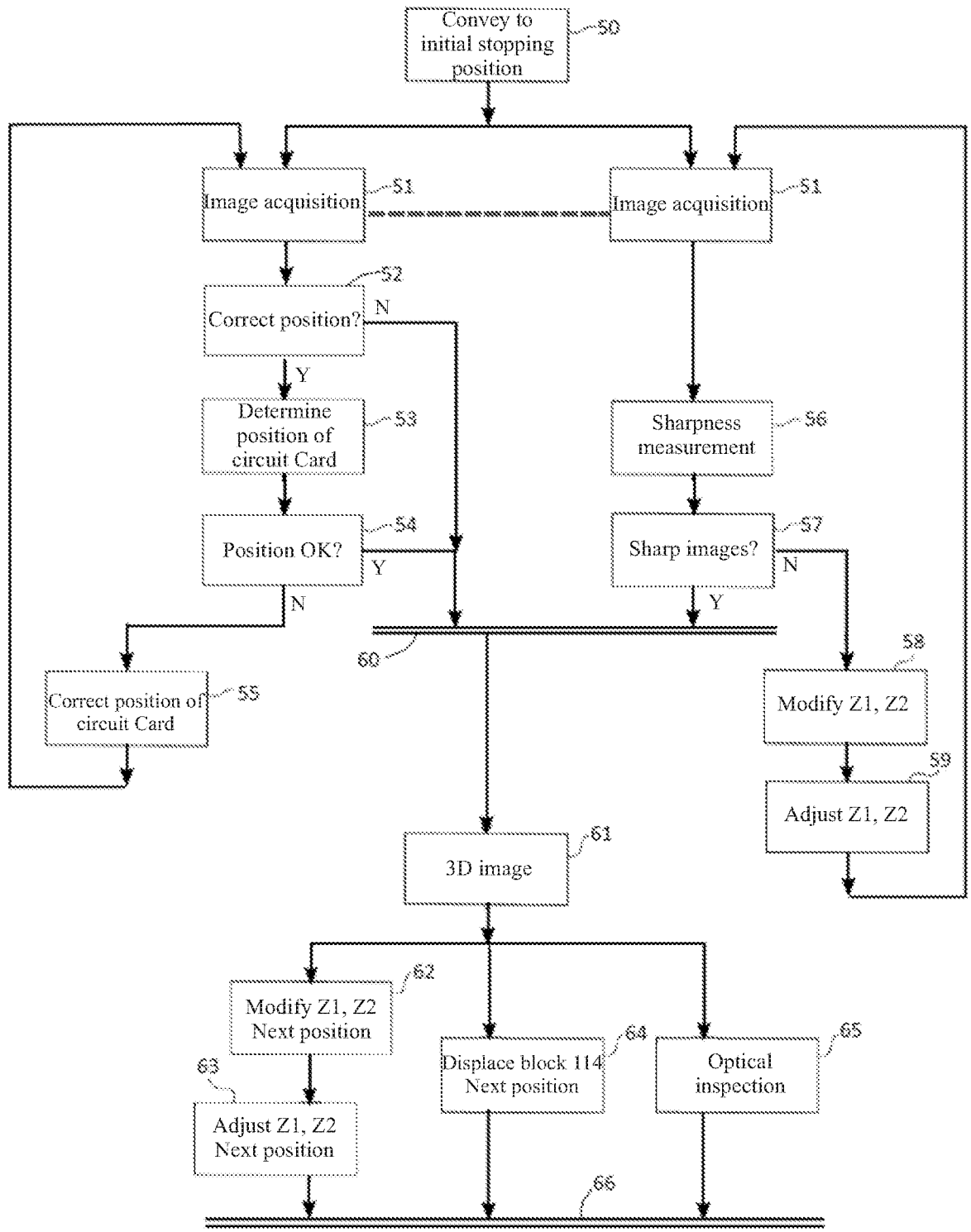
FIG. 4 shows in the form of a block diagram an embodiment of a method of optical inspection of an electronic circuit.

The foregoing and other features and advantages will be discussed in detail in the following non-limiting description of specific embodiments in connection with the accompanying drawings, among which:

FIGS. 1, 2 and 3 respectively are a perspective view, a top view, and a side view, partial and simplified, of an embodiment of an optical inspection system; and FIG. 4 shows in the form of a block diagram an embodiment of a method of optical inspection of an electronic circuit.

As an example, the general field of view of projector-camera block 14 has been schematically shown by two dotted lines R1, R2. Reference $Card_i$ designates the portion of electronic circuit Card, a three-dimensional image of which may be determined by processing system 16 based on the images acquired by cameras C for a given image acquisition position of projector-camera block 14.

The three-dimensional images of an integer N of circuit portions $Card_i$, where i is an integer varying from 1 to N, should be acquired to determine the three-dimensional image of the entire circuit Card. As an example, N typically varies from 1 to 10. Each circuit portion $Card_i$ comprises an initial edge $BI_i$, which is the leftmost edge of FIG. 2, and a final edge $BF_i$, which is the rightmost edge in FIG. 2.

According to an embodiment, to decrease the number of images to be acquired in order to determine the three-dimensional image of the entire circuit Card, possibly except for the circuit edges, the image acquisition positions are selected so that the overlapping between circuit portion $Card_i$ in the field of view of projector-camera block 14 at an image acquisition position and circuit portion $Card_{i+1}$ in the field of view of projector-camera blocks 14 at the next image acquisition position is smaller than 20% of the length of circuit portion $Card_i$ measured along direction Y, and preferably substantially zero. This means that final edge $BF_i$ of circuit portion $Card_i$ substantially corresponds to initial edge $BI_{i+1}$ of the next circuit portion $Card_{i+1}$.

In order for the three-dimensional image to be accurately determined, the two-dimensional images acquired by cameras C should not be blurred. Circuit Card should thus be placed in the sharpness zone of cameras C. Circuit Card is brought by conveyor 12 to the level of a reference plane PREF having a known position relative to cameras C so that, if circuit Card is perfectly planar, it is located in the sharpness zone of cameras C.

However, circuit Card may be non-planar. As an example, circuit Card is shown FIG. 3 with a generally downward-facing convexity which is exaggerated for illustration purposes. It should however be clear that the deformations of circuit Card cannot be regular along direction Y. In particular, in a cross-section plane perpendicular to direction X, circuit Card may comprise portions with an upward convexity and portions with a downward convexity. However, in the case of a warping, the deformations are generally substantially independent from direction X. Generally, for a circuit Card having the shape of a rectangular card with a length and a width varying from 50 mm to 550 mm, the deformations measured along a direction Z perpendicular to directions X and Y are generally smaller than a few millimeters.

Optical inspection system 10 comprises a device 20, shown in FIG. 3, of displacement of circuit Card capable of taking circuit Card, at each image acquisition position, into the sharpness zone of cameras C. Device 20 may have the structure described in patent application. WO2014/167248. According to an embodiment, device 20 is capable of taking circuit Card closer to or away from camera-projector block 14. Device 20 is capable of independently displacing two different portions of circuit Card, each along direction Z. As an example, direction Z is the vertical direction.

According to an embodiment, device 20 comprises two supports 22, 24, shown in FIG. 3, which substantially extend along direction X. Support 22 comprises an upper end 23, which may bear against a lateral edge 26 of circuit Card, and support 24 comprises an upper end 25, which may bear against the opposite lateral edge 28 of circuit Card. Ends 23 and 25 may contain straps, not shown, enabling to convey the electronic circuits. As an example, each end 23, comprises a planar portion which extends across part of the width of circuit Card, along direction X. As an example, a strip of conveyor 12, not shown in FIG. 3, may be sandwiched between edge 26 of circuit Card and support 22 or between edge 28 of circuit Card and support 24 when supports 22, 24 are taken against edges 26, 28 of circuit Card.

Device 20 is capable of modifying height $Z_1$ of the top of support 22 and height $Z_2$ of the top of support 24 independently from each other. As an example, device 20 comprises two actuators 30, 32, for example, step-by-step rotary electric motors, each rotating a cam 34, 36 around art axis parallel to direction Y. Each cam 34, 36 is, for example, a cam with an external profile having a portion of the associated support 22, 24 resting thereon. Height $Z_1$ depends on the angular position of cam 34 and height $Z_2$ depends on the angular position of cam 36. Actuators 30, 32 are controlled by processing system 16. As a variation, linear actuators which directly displace supports 22, 24 along direction Z may be used.

Device 20 further comprises a device 38 for locking edge 26 of circuit Card on support 22 and a device 40 for locking edge 28 on support 24. Each locking device 38, 40 follows the displacement of the associated support 20, 22 along direction Z. Locking systems 38, 40 are controlled by processing system 16 to maintain edges 26, 28 of circuit Card against supports 22, 24 after circuit Card has been displaced along direction X all the way to the position where the image acquisitions are performed. As an example, each locking device 38, 40 corresponds to a clamp actuated by an actuator controlled by processing system 16.

According to an embodiment, processing system 16 is capable of determining offset ΔX along direction X between the real position X1 of circuit Card and the desired inspection position X0 based on the images acquired by cameras C. The position of circuit Card can then be modified along direction X when the real position of circuit Card becomes too distant from the desired inspection position X0 and/or corrections can be made on implementation of the subsequent steps of the optical inspection method to take into account the determined offset ΔX.

To avoid excessively increasing the duration of the optical inspection method, the images used to determine the position offset of circuit Card are images which are used at another step of the optical inspection method. Preferably, the images used to determine the position offset of circuit Card are images which area acquired in one of the first steps of the optical inspection method. Thereby, if the position of circuit Card along direction X has to be modified, the number of steps of the optical inspection method which should be carried out again is decreased. According to an embodiment, processing system 16 is capable of determining the position of circuit Card along direction X based on the images acquired by cameras C during an operation of displacement of circuit Card along direction Z to take circuit Card into the sharpness zone of cameras C.

According to an embodiment, the images used to determine the position offset of circuit Card are images acquired by part of cameras C, called active group hereafter. According to an embodiment, the active group comprises a number of cameras C smaller than the total number of cameras C. The active group for example comprises from two to eight cameras, for example, four cameras. According to an embodiment, the cameras of the active group are determined before the implementation of the method by an analysis of the images expected for each camera.

FIG. 4 shows, in the form of a block diagram, an embodiment of a method of optical inspection of circuit Card.

At step 50, circuit Card is displaced by conveyor 12 to an initial inspection position which is for example obtained by the detection of circuit Card by position sensor S. When circuit Card is being inspected, according to the portion of circuit Card to be inspected, it is possible for step 50 not to comprise the displacement of circuit Card by conveyor 12. The method carries on at step 51.

First and second processes are then carried out in parallel. The first process comprises steps 51, 52, 53, 54, and 55. The second process comprises step 51 and steps 56, 57, 58, 59.

At step 51, processing system 16 controls the acquisition of two-dimensional images of circuit portion Cardi by the cameras C of projector-camera block 14. The same images acquired at step 51 are used by the first and second processes. For the first process, the method carries on at step 52 while for the second process, the method carries on at step 56.

At step 52 of the first process, processing system 16 determines whether the method of correction of the position of circuit Card along direction X should be implemented. If it should, the method carries on at step 53. According to an embodiment, the method of correcting the position of circuit Card along direction X may be only implemented for the first image acquisition following the introduction of circuit Card into optical inspection system 10.

At step 53 of the first process, processing system 16 determines offset ΔX based on the analysis of the two-dimensional images of the first portion of circuit Card1 acquired by the cameras of the active group at step 51. At step 53, the image acquired by each camera C of the active group is compared with at least one reference image for the considered camera. Processing system 16 comprises a memory having the reference images stored therein. For each camera of the active group, the reference image may correspond to the color or grey-level image which would be acquired by camera C in determined lighting conditions if circuit Card was in the desired inspection position. The reference image thus is an image representing at least a portion of circuit. Card in the desired inspection position. The reference image does not correspond to a test chart, that is, to an image comprising predetermined geometric shapes and which is generally used for a camera calibration operation. Preferably, the reference image covers a portion of circuit Card larger than that which is really obtained with camera C. The reference image may be the same for a plurality of cameras C of the active group when it covers a portion of circuit Card which contains the image to be acquired by these cameras C.

For each camera C of the active group, a preprocessing of the image acquired by camera C may be implemented to enable to compare the image acquired by camera C with the reference image. According to an embodiment, the image acquired by camera C is an image which is used at a subsequent step for the determination of a 3D image of circuit Card. The image may be acquired by camera C while fringes are projected on the circuit Card to be inspected. The preprocessing may then comprise a filtering of the acquired image to obtain a grey-level image corresponding to the image which would be acquired by camera C in the absence of a projection of fringes. In the rest of the description, for each camera C of the active group, when the image acquired by camera C is considered, it is the image acquired by the camera C to which a preprocessing may have been applied.

The step of comparison of the acquired image with the reference image ay comprise determining the position of the acquired image in the reference image. According to an embodiment, for each camera C of the active group, processing system 16 determines the normalized cross correlation or NCC along direction X between the acquired image and the reference image. The cross correlation, is a function which depends on the position along direction X of the acquired image, and which exhibits a peak when the acquired image is at a position at which it is best superposed to the reference image. Processing system 16 may further determine, a general function based on the normalized cross correlations for the cameras of the active group. According to an embodiment, if it is considered that the active group comprises M cameras, where M is an integer smaller than the total number of cameras, processing system 16 determines M normalized cross correlations $NCC_j$, j being an integer varying from 1 to M. Processing system 16 then determines function F from the M cross correlations $NCC_j$, which depends on the position along direction X of the acquired images. The position of the maximum of function F indicates the offset ΔX between the real position X1 of circuit Card and the desired inspection position X0. According to an embodiment, function F may be provided by the following relation (1):

$$F = \Pi_{i=1}^{j=M}(1+|NNC_j|) \quad (1)$$

According to an embodiment, for each camera C of the active group, the acquired image is compared with more than one reference image. In addition to the previously-described reference image, called first reference image, a second reference image may correspond to the first previously-described reference image to which a blurring processing has been applied. A third reference image may correspond to the first reference image to which a contour extraction processing has been applied. For each camera C of the active group, to compare the image acquired by the camera with the third reference image, the contour extraction processing is applied to the acquired image and the image thus modified is compared with the third reference image. A fourth reference image may correspond to the third previously-described reference image to which a blurring processing has been applied. In the case where more than one reference image is used for each image of the active group, the method may comprise determining, for each reference image, offset ΔX, for example as previously described, and determining an average offset $ΔX_{moy}$ based on offsets ΔX, for example, by determining the average of offsets ΔX. As a variation, offset ΔX may be determined by using the previously-described function F with all the reference images. The method carries on at step 54.

At step 54 of the first process, processing system 16 determines whether a correction of the position of circuit Card should be implemented. According to an embodiment, processing system 16 compares the offset ΔX determined at step 53 with a threshold. If offset ΔX is greater than the threshold, the method carries on at step 55.

At step 55 of the first process, processing system 16 controls conveyor 12 to displace circuit Card along direction X by offset ΔX. The method carries on at step 51 for the first process.

If, at step 54, offset ΔX is smaller than the threshold, circuit Card is not displaced. However, processing system 16 may correct the position of the pixels of the images acquired by cameras C by offset ΔX at the subsequent steps of the method. The first process is finished and the method carries on at step 60.

If, at step 52, processing system 16 determines that the method of correcting the position of circuit Card should not be implemented, the first process is finished and the method carries on at step 60.

At step 56 of the second process, processing system 16 determines whether circuit portion $Card_i$ sharply appears on the two-dimensional images acquired by cameras C by analysis of the two-dimensional images acquired at step 51 or by analysis of a three-dimensional image determined from the two-dimensional images acquired by cameras C. In particular, processing system 16 is capable of determining whether circuit portion $Card_i$ is partly or totally located in the sharpness zone of cameras C, in front of the first focused plane of cameras C or behind the last focused plane of cameras C. The three-dimensional images that may have been determined at step 56 may not be as precise as a three-dimensional image determined at a subsequent step of the optical inspection method used to search for defects of circuit Card. The method carries on at step 57.

At step 57, processing system 16 determines whether the sharpness of the two-dimensional images acquired by cameras C or to lie acquired by cameras C is sufficient to determine a three-dimensional image at the desired precision. If all or part of portion Cardi does not sharply appear on the pictures acquired or to be acquired by cameras C, the method carries on at step 58.

At step 58, processing system 16 determines heights $Z_1$ and $Z_2$ to be provided so that the entire circuit portion $Card_i$ sharply appears on the images acquired or to be acquired by cameras C.

As an example, first circuit portion $Card_1$ is close to edge 26, which has a known position. Indeed, edge 26 is initially maintained in reference plane $P_{REF}$, which is part of the sharpness zone of cameras C. In this case, height $Z_2$ is modified so that final edge $BF_1$ of circuit portion $Card_1$ is taken back. into reference plane $P_{REF}$. The new value of height $Z_2$ is for example determined based on the position of edge $BF_1$ relative to plane $P_{REF}$ determined by analysis of the range-finder measurements, based on the images acquired by the image acquisition devices other than cameras C, on the images acquired by cameras C, and/or during the determination of the 3D image of circuit portion $Card_1$.

As an example, for a circuit portion $Card_i$, i being greater than 1, edge $BI_i$ is located in plane $P_{REF}$ or at least in the sharpness zone of cameras C after the settings of heights $Z_1$ and $Z_2$ at the previous cycle, in this case, heights $Z_1$ and $Z_2$ are modified so that initial edge $BI_i$ is maintained in reference plane $P_{REF}$ and that final edge $BF_i$ is taken back into reference plane $P_{REF}$. The new values of height $Z_1$ and $Z_2$ are determined based on the position of edge $BF_i$ relative to plane $P_{REF}$ determined by analysis of the range-finder measurements, on the images acquired by the image acquisition devices other than cameras C, on the images acquired by cameras C, and/or during the determination of the 3D image of circuit portion $Card_i$. The method carries on at step 59.

At step 59, actuators 30 and 32 are implemented by processing system 16 to take the tops of supports 22 and 24 respectively up to heights $Z_1$ and $Z_2$. The method carries on at step 51.

At step 57, if the entire first portion Card1 sharply appears on the images acquired or to be acquired by cameras C, the second process is finished and the method carries on at step 60.

At step 60, the first and second processes are expected to end. When the first and second processes are finished, the method carries on at step 61.

At step 61, two-dimensional images of first circuit portion $Card_1$ are acquired by cameras C of projector-camera block 14 and processing system 16 determines a three-dimensional image of first circuit portion $Card_1$. However, if, at steps 51 and/or 56, two-dimensional images have already been acquired by cameras C and a three-dimensional image has already been determined, step 61 may be omitted. If, at step 51, two-dimensional images have already been acquired by cameras C but there has been no determination of a three-dimensional image, the three-dimensional image may be determined at step 61 based on the images acquired at step 51. According to another embodiment, at step 61, new images are acquired independently from the images acquired at previous steps. The acquired images may comprise color images and grey-level images for purposes of determination of a three-dimensional image.

Third, fourth, and fifth processes are then carried out in parallel. The third process comprises steps 62 and 63. The fourth process comprises step 64. The fifth process comprises step 65.

At step 62 of the third process, processing system 16 determines the new values of heights $Z_1$ and $Z_2$ so that the entire circuit portion $Card_{i+1}$ sharply appears on the images which will be acquired by cameras C at the next position of projector-camera block 14.

As an example, for a circuit portion $Card_i$, edge $BI_i$ is substantially located in plane $P_{REF}$ or at least in the sharpness zone of cameras C after the settings of heights $Z_1$ and $Z_2$ at the previous cycle. In this case, heights $Z_1$ and $Z_2$ may be modified so that initial edge $BI_{i+1}$ of portion $Card_{i+1}$, which substantially corresponds to final edge $BF_i$ of circuit portion $Card_i$, is maintained in reference plane $P_{REF}$ and so that final edge $BF_{i+1}$ of portion $Card_{i+1}$ is taken back into reference plane $P_{REF}$. Since no image of circuit portion $Card_{i+1}$ has been acquired yet. the new values of heights $Z_1$ and $Z_2$ may be determined by extrapolation from the general shape of portion $Card_i$, for example, considering that circuit portion $Card_{i+1}$ has substantially the same shape as circuit portion $Card_i$, taking into account the curvature variation of the previous circuit portions $Card_i$, $Card_{i-1}$, $Card_{i-2}$, . . . , taking into account the profiles of the identical electronic circuits previously measured or by instantaneous measurement of circuit portion $Card_i$ to be inspected, or by combination of these solutions. When the 3D image of circuit portion $Card_i$ has been determined at step 61, processing system 16 determines the new values of height $Z_1$ and $Z_2$ so that the entire new circuit portion Card1 of circuit Card which will be obtained after the displacement of circuit Card along direction X sharply appears on the image which w ill be acquired by cameras C at the next position of projector-camera block 14. The method carries on at step 63.

At step 63 of the third process, actuators 30 and 32 are controlled by processing system 16 to displace supports 22 and 24 to the new values of the heights, respectively $Z_1$ and $Z_2$. The third process is then finished and the method carries on at step 66.

At step 64 of the fourth process, projector-camera block 14 is displaced to the next position along direction Y for the determination of the three-dimensional image of circuit portion Cardi+1. When the 3D image of circuit portion $Card_N$ has been determined at step 61, projector-camera block 14 is displaced along direction Y for the determination of the three-dimensional image of the new circuit portion $Card_1$ of circuit Card which would be obtained after the displacement of circuit Card along direction X. The fourth process is then finished and the method carries on at step 66.

According to another embodiment, steps 62 and 63 are not present.

At step 65 of the fifth process, a method of optical inspection of circuit portion $Card_i$ may be implemented, for example, based on an analysis of the three-dimensional image of circuit portion $Card_i$, for a defect search in circuit portion $Card_i$. When the fifth process is finished, the method carries on at step 66.

At step 66, the third, fourth, and fifth processes are expected to end. When the third, fourth, and fifth processes are finished, the method carries on at step 50 for the optical inspection of another portion of circuit Card.

In the previously-described embodiment, optical inspection system 10 comprises at least one sensor S to control the stopping of conveyor 12 and the previously-described steps 51, 52, 53, 54, and 55 are carried out while circuit Card is stopped. According to another embodiment, steps 51, 52, and 53 are implemented while conveyor 12 is displacing circuit Card. Based on the position offset ΔX of circuit Card determined at step 53, processing system 16 may control conveyor 12 to slow down and stop circuit Card at the desired inspection position X0. Optical inspection system 10 may then advantageously comprise no mechanical, magnetic, or light radiation projection sensor to control the stopping of conveyor 12.

Specific embodiments have been described. Various alterations and modifications will occur to those skilled in the art. In particular, although previously-described system 10 is capable of implementing a method of determining a three-dimensional image of an object by image projection on the object, it should be clear that the three-dimensional image determination method may be different, for example, implementing methods of inspection of images acquired by the cameras with no image projection onto circuit Card.

Further, although in the previously-described embodiment, the electronic circuit is taken at step 59 into the sharpness zone of the cameras by the displacement along direction Z of the edges of electric circuit Card, step 59 may be implemented by the displacement of projector-camera block 14 along direction Z, while electronic circuit Card is not displaced along direction Z.

Further, although in the previously-described embodiment, the images acquired by the cameras of the active group and used to determine the position offset ΔX of circuit Card are images used to take the circuit into the sharpness zone of the cameras, it should be clear that the images used to determine the position offset ΔX of circuit Card may be images acquired at another step of the optical inspection method. As an example, the images acquired by the cameras and used to determine the position offset ΔX of circuit Card are images used to determine the three-dimensional image of circuit Card at the previously-described step 61.

What is claimed is:

1. A method of optical inspection of an electric circuit comprising:

the acquisition of images of the electronic circuit by image sensors;

the use of the images to determine the offset between the position of the electronic circuit and an inspection position comprising comparing, for each image sensor among some of the image sensors, the image acquired by the image sensor with at least one reference image of the electronic circuit; and the use of said images in at least another step of the method, wherein the image sensors are displaced along a first direction with respect to the electronic circuit at least from a first location along the first direction to acquire images of a first portion of the electronic circuit to a second location along the first direction to acquire images of a second portion of the electronic circuit, the electronic circuit being displaced to a first position when the image sensors are at the first location and in a second position, different from the first position, when the image sensors are at the second location, or the image sensors being displaced along a second direction, which is not parallel to the first direction, to a third position along the second direction when the image sensors are at the first location along the first direction and to a fourth position along the second direction, different from the third position, when the image sensors are at the second location along the first direction, the images of the first portion and/or the images of the second portion being used to determine the offset between the position of the electronic circuit and the inspection position.

2. The method of claim 1, comprising modifying the position of the electronic circuit when said offset is greater than a threshold.

3. The method of claim 1, comprising comparing, for each image sensor among some of the image sensors, the acquired image with at least one additional reference image obtained from the reference image.

4. The method of claim 3, comprising comparing, for each image sensor among some of the image sensors, the image acquired by the image sensor with a first reference image and with a second reference image obtained by blurring of the first reference image.

5. The method of claim 4, comprising comparing, for each image sensor among some of the image sensors, the image acquired by the image sensor with a third reference image obtained by extraction of contours of the first reference image.

6. The method of claim 5, comprising comparing, for each image sensor among some of the image sensors, the image acquired by the image sensor with a fourth reference image obtained by blurring of the third reference image.

7. The method of claim 1, further comprising the steps of:
determining a sharpness criterion for the acquired images of the electronic circuit; and
bringing closer or taking away at least a portion of the electronic circuit to or from the image sensors if the sharpness criterion is not fulfilled.

8. The method of claim 1, wherein the first portion of the electronic circuit is in a sharpness zone of the image sensors when the electronic circuit is in the first position or when the image sensors are in the third position, and the second portion of the electronic circuit is in the sharpness zone of the image sensors when the electronic circuit is in the second position or when the image sensors are in the fourth position.

9. The method of claim 1, wherein the electronic circuit comprises a printed circuit, each support supporting a lateral edge of the printed circuit.

10. The method of claim 1, wherein a conveyor transports the electronic circuit along a conveying direction of the electronic circuit, the supports extending parallel to the conveying direction of the electronic circuit.

11. The method of claim 10, wherein a displacement device transports the image sensors along a displacement direction of the image sensors, which is not parallel to the conveying direction of the electronic circuit.

12. The method of claim 11, wherein the displacement direction of the image sensors is perpendicular to the conveying direction of the electronic circuit.

13. The method of claim 11, wherein each support is displaced, independently from each other, along a support displacement direction, which is not parallel to the conveying direction of the electronic circuit and to the displacement direction of the image sensors.

14. The method of claim 13, wherein the support displacement direction is perpendicular to the conveying direction of the electronic circuit and to the displacement direction of the image sensors.

15. A method of optical inspection of an electronic circuit comprising:
the acquisition of images of the electronic circuit by image sensors;
the use of the images to determine the offset between the position of the electronic circuit and an inspection position comprising comparing, for each image sensor among some of the image sensors, the image acquired by the image sensor with at least one reference image of the electronic circuit; and
the use of said images in at least another step of the method,
wherein at least two portions of the electronic circuit rest on two supports and wherein the other step comprises modifying the position of each support, independently from each other.

16. The method of claim 15, wherein the electronic circuit comprises a printed circuit, each support supporting a lateral edge of the printed circuit.

17. The method of claim 15, wherein a conveyor transports the electronic circuit along a conveying direction of the electronic circuit, the supports extending parallel to the conveying direction of the electronic circuit.

18. The method of claim 17, wherein a displacement device transports the image sensors along a displacement direction of the image sensors, which is not parallel to the conveying direction of the electronic circuit.

19. The method of claim 18, wherein each support is displaced, independently from each other, along a support displacement direction, which is not parallel to the conveying direction of the electronic circuit and to the displacement direction of the image sensors.

20. The method of claim 19, wherein the support displacement direction is perpendicular to the conveying direction of the electronic circuit and to the displacement direction of the image sensors.

21. The method of claim 18, wherein the displacement direction of the image sensors is perpendicular to the conveying direction of the electronic circuit.

22. The method of claim 15, comprising modifying the position of the electronic circuit when said offset is greater than a threshold.

23. The method of claim 15, comprising comparing, for each image sensor among some of the image sensors, the acquired image with at least one additional reference image obtained from the reference image.

24. The method of claim 15, comprising comparing, for each image sensor among some of the image sensors, the image acquired by the image sensor with a first reference image and with a second reference image obtained by blurring of the first reference image.

25. The method of claim 24, comprising comparing, for each image sensor among some of the image sensors, the image acquired by the image sensor with a third reference image obtained by extraction of contours of the first reference image.

26. The method of claim 25, comprising comparing, for each image sensor among some of the image sensors, the image acquired by the image sensor with a fourth reference image obtained by blurring of the third reference image.

27. The method of claim 15, further comprising the steps of:

determining a sharpness criterion for the acquired images of the electronic circuit; and bringing closer or taking away at least a portion of the electronic circuit to or from the image sensors if the sharpness criterion is not fulfilled.

28. The method of claim 15, wherein the first portion of the electronic circuit is in a sharpness zone of the image sensors when the electronic circuit is in the first position or when the image sensors are in the third position, and the second portion of the electronic circuit is in the sharpness zone of the image sensors when the electronic circuit is in the second position or when the image sensors are in the fourth position.

\* \* \* \* \*